(12) United States Patent
Nearpass et al.

(10) Patent No.: US 10,986,976 B2
(45) Date of Patent: Apr. 27, 2021

(54) DISHWASHER WITH DOOR LATCH ASSEMBLY

(71) Applicant: WHIRLPOOL CORPORATION, Benton Harbor, MI (US)

(72) Inventors: Charles E. Nearpass, Berrien Springs, MI (US); Michael E. Gatt, Saint Joseph, MI (US); Thomas M. O'Brien, Saint Joseph, MI (US); Jason A. Cackley, South Bend, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 387 days.

(21) Appl. No.: 16/017,080

(22) Filed: Jun. 25, 2018

(65) Prior Publication Data

US 2019/0387951 A1    Dec. 26, 2019

(51) Int. Cl.
*A47L 15/42*    (2006.01)
*F16B 2/22*    (2006.01)
*F16B 21/08*    (2006.01)

(52) U.S. Cl.
CPC ............ *A47L 15/4259* (2013.01); *F16B 2/22* (2013.01); *F16B 21/086* (2013.01)

(58) Field of Classification Search
CPC ....... A47L 15/4259; F16B 2/22; F16B 21/086
See application file for complete search history.

(56) References Cited

U.S. PATENT DOCUMENTS

| | | | |
|---|---|---|---|
| 3,841,675 A | 10/1974 | Mercer | |
| 3,854,762 A * | 12/1974 | Spiegel | A47L 15/4259 292/197 |
| 5,174,618 A * | 12/1992 | Kropf | A47L 15/4259 292/254 |
| 6,527,315 B2 | 3/2003 | Marks et al. | |
| 7,347,460 B2 * | 3/2008 | Ala | A47L 15/4259 292/216 |
| 9,453,523 B2 | 9/2016 | Maschat et al. | |
| 9,822,550 B2 | 11/2017 | Fenwick | |
| 9,899,822 B2 | 2/2018 | Richardson et al. | |
| 2004/0163684 A1 * | 8/2004 | Hapke | A47L 15/4259 134/57 DL |

(Continued)

FOREIGN PATENT DOCUMENTS

EP    0331220 B1    4/1993

OTHER PUBLICATIONS repairclinic.com, Whirlpool Dishwasher Door Strike Replacement #8580309, YouTube, https://www.youtube.com/watch?v=8r-pm3l2iz4, Published Jun. 25, 2013, accessed Apr. 20, 2018.

(Continued)

*Primary Examiner* — Benjamin L Osterhout
(74) *Attorney, Agent, or Firm* — McGarry Bair PC

(57) ABSTRACT

A dishwasher includes a tub at least partially defining a treating chamber with an access opening and having a top wall. A door is movable between opened and closed positions to selectively close the access opening. A receiving collar is coupled to one of the tub or the door and has an opening and a deflecting surface accessible through the opening. A strike plate is coupled to the other of the tub or the door and received within the opening in the receiving collar in an insertion direction. The strike plate has at least one biasing element.

20 Claims, 9 Drawing Sheets

(56) References Cited

U.S. PATENT DOCUMENTS

| | | | |
|---|---|---|---|
| 2010/0026015 A1* | 2/2010 | Joerger | E05B 15/024 292/254 |
| 2010/0117378 A1* | 5/2010 | Seo | D06F 37/42 292/163 |
| 2012/0032569 A1* | 2/2012 | Hill | E05C 17/50 312/228 |
| 2014/0298638 A1 | 10/2014 | Colombo et al. | |
| 2015/0238065 A1* | 8/2015 | Osvatic | E05C 19/024 49/394 |
| 2018/0000312 A1* | 1/2018 | Dirnberger | E05B 15/0295 |
| 2018/0140162 A1* | 5/2018 | Citak | A47L 15/4259 |
| 2018/0368652 A1* | 12/2018 | Krieger | E05C 5/00 |
| 2019/0040654 A1* | 2/2019 | Dirnberger | D06F 37/28 |

OTHER PUBLICATIONS repairclinic.com, Kenmore Dishwasher Door Strike Replacement #154662601, YouTube, https://www.youtube.com/watch?v=mLa60k5shol, Published Jun. 25, 2013, accessed Apr. 20, 2018.

\* cited by examiner

US 10,986,976 B2

DISHWASHER WITH DOOR LATCH ASSEMBLY

BACKGROUND

Contemporary automatic dishwashers for use in a typical household include a tub that can have an open front and at least partially defines a treating chamber into which items, such as kitchenware, glassware, and the like, can be placed to undergo a washing operation. At least one rack or basket for supporting soiled dishes can be provided within the tub. A spraying system with multiple sprayers can be provided for recirculating liquid throughout the tub to remove soils from the dishes.

The dishwasher can be provided with a door, which can be pivotally mounted to the tub, that closes the open front. A door latch assembly can be provided to hold the door in a closed condition. The door latch assembly can include a latch provided with the door and configured to selectively couple with a strike plate provided with the tub to hold the door in the closed condition. In order to have ideal tolerance for the closing of the door, the strike plate must be installed and positioned precisely. This can require increased installation force and effort, as well as parts that are costly to manufacture. If the strike plate is not precisely positioned and held robustly in place, difficulty in closing the door or rattling noises which can be unpleasant to a user can result.

BRIEF SUMMARY

In one aspect, illustrative embodiments in accordance with the present disclosure relate to a dishwasher including a tub at least partially defining a treating chamber with an access opening and having a top wall, a door movable between opened and closed positions to selectively close the access opening, a receiving collar coupled to one of the tub or the door and having an opening and a deflecting surface accessible through the opening, and a strike plate coupled to the one of the tub or the door and received within the opening in the receiving collar in an insertion direction, the strike plate having at least one biasing element biased in a first plane having a component in a lateral direction perpendicular to the insertion direction such that inserting the biasing element into the opening in the insertion direction results in the biasing element being biased in the lateral direction by the deflecting surface.

In another aspect, illustrative embodiments in accordance with the present disclosure relate to a dishwasher including a tub at least partially defining a treating chamber with an access opening and having a top wall, a door movable between opened and closed positions to selectively close the access opening, a receiving collar coupled to one of the tub or the door and having an opening and a deflecting surface accessible through the opening, and a strike plate coupled to the one of the tub or the door and received within the opening in the receiving collar in an insertion direction, the strike plate having at least two biasing elements biased in directions perpendicular to one another.

DETAILED DESCRIPTION OF EMBODIMENTS OF THE INVENTION

Figure 1:
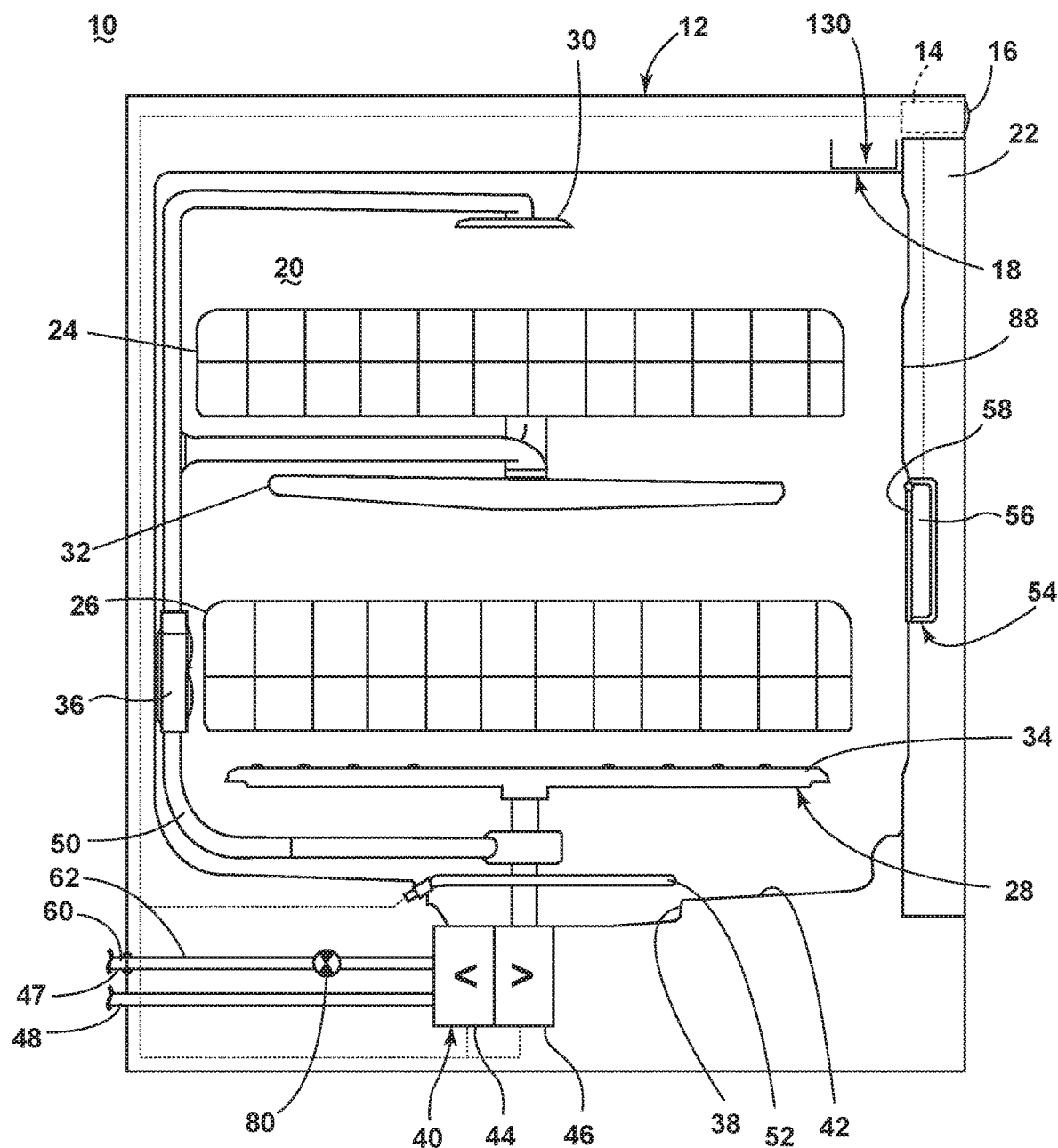
FIG. 1 illustrates a schematic, side view of a dishwasher according to an embodiment of the present disclosure.

FIG. 1 is a schematic, side view of a dishwasher 10 for treating dishes according to an automatic cycle of operation, according to an embodiment of the present disclosure. In FIG. 1, the dishwasher 10 includes a chassis 12 defining an interior. Depending on whether the dishwasher 10 is a stand-alone or built-in dishwasher, the chassis 12 can be a frame with or without panels attached, respectively. The dishwasher 10 shares many features of a conventional automatic dishwasher, which will not be described in detail herein except as necessary for a complete understanding of the invention. While the present invention is described in terms of a conventional dishwashing unit, it can also be implemented in other types of dishwashing units, such as in-sink dishwashers, multi-tub dishwashers, or drawer-type dishwashers.

A controller 14 can be located within the chassis 12 and can be operably coupled with various components of the dishwasher 10 to implement one or more cycles of operation. A control panel or user interface 16 can be provided on the dishwasher 10 and coupled with the controller 14. The user interface 16 can be provided on the chassis 12 or on the outer panel of the door 22 and can include operational controls such as dials, lights, switches, and displays enabling a user to input commands, such as a cycle of operation, to the controller 14 and receive information about the selected cycle of operation.

Figure 3:
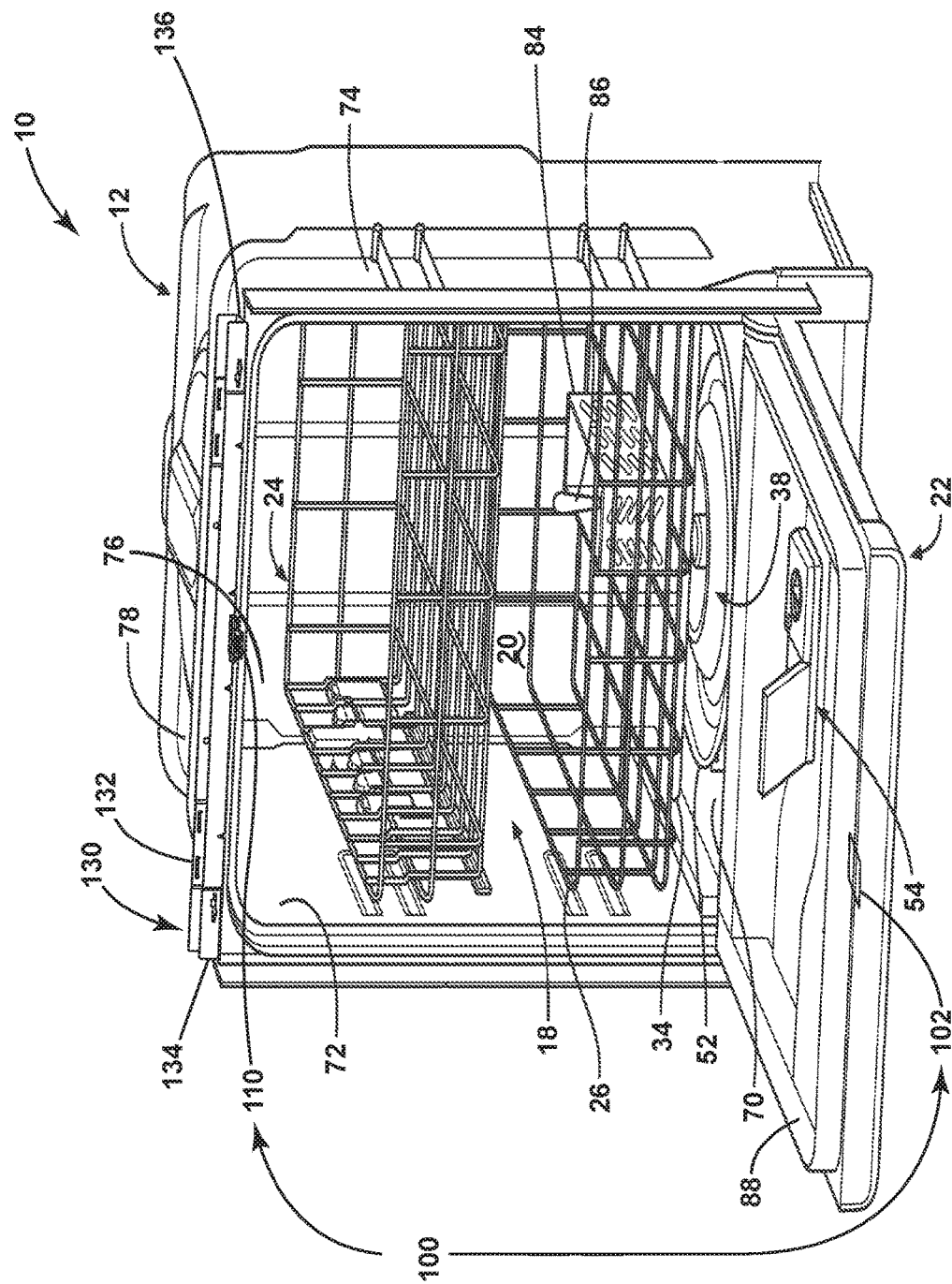
FIG. 3 illustrates a perspective view of the dishwasher of FIG. 1 including a door latch assembly in accordance with an embodiment of the present disclosure.

A tub 18 is located within the interior of and mounted to the chassis 12 and at least partially defines a treating chamber 20 with an access opening in the form of an open face. A cover, illustrated as a door 22, can be hingedly or pivotally mounted to the chassis 12 and can selectively move between an opened position, as shown in FIG. 3, wherein the user can access the treating chamber 20, and a closed position, as shown in FIG. 1, wherein the door 22 covers or closes the open face of the treating chamber 20.

Dish holders in the form of upper and lower racks 24, 26 are located within the treating chamber 20 and receive dishes for being treated. The racks 24, 26 are mounted for slidable movement in and out of the treating chamber 20 for ease of loading and unloading. As used in this description, the term "dish(es)" is intended to be generic to any item, single or plural, that may be treated in the dishwasher 10, including, without limitation; dishes, plates, pots, bowls, pans, glassware, silverware, and other utensils. While not shown, additional dish holders, such as a silverware basket on the interior of the door 22 or a third level rack above the upper rack 24 can also be provided.

A spraying system 28 can be provided for spraying liquid into the treating chamber 20 and is illustrated in the form of an upper sprayer 30, a mid-level sprayer 32, a lower sprayer 34, and a spray manifold 36. The upper sprayer 30 can be located above the upper rack 24 and is illustrated as a fixed spray nozzle that sprays liquid downwardly within the treating chamber 20. Mid-level sprayer 32 and lower sprayer 34 are located beneath upper rack 24 and lower rack 26, respectively, and are illustrated as rotating spray arms. The mid-level sprayer 32 can provide a liquid spray upwardly through the bottom of the upper rack 24. The lower sprayer 34 can provide a liquid spray upwardly through the bottom of the lower rack 26. The mid-level sprayer 32 can optionally also provide a liquid spray downwardly onto the lower rack 26, but for purposes of simplification, this will not be illustrated herein.

The spray manifold 36 can be fixedly mounted to the tub 18 adjacent to the lower rack 26 and can provide a liquid spray laterally through a side of the lower rack 26. The spray manifold 36 is not limited to this position; rather, the spray manifold 36 can be located in any suitable part of the treating chamber 20. While not illustrated herein, the spray manifold 36 can include multiple spray nozzles having apertures configured to spray wash liquid towards the lower rack 26. The spray nozzles can be fixed or rotatable with respect to the tub 18. Suitable spray manifolds are set forth in detail in U.S. Pat. No. 7,445,013, filed Jun. 17, 2003, and titled "Multiple Wash Zone Dishwasher," and U.S. Pat. No. 7,523,758, filed Dec. 30, 2004, and titled "Dishwasher Having Rotating Zone Wash Sprayer," both of which are incorporated herein by reference in their entirety. Instead of or in addition to the spray manifold 36 provided on the rear wall, nozzles can be provided on the right and left side walls of the tub 18.

A liquid recirculation system can be provided for recirculating liquid from the treating chamber 20 to the spraying system 28. The recirculation system can include a sump 38 and a pump assembly 40. The sump 38 collects the liquid sprayed in the treating chamber 20 and can be formed by a sloped or recess portion of a bottom wall 42 of the tub 18. The pump assembly 40 can include both a drain pump 44 and a recirculation pump 46.

The liquid recirculation system can also be fluidly coupled with a water supply line 47 for receiving fresh water from a water supply source, such as a household water supply, as well as a water supply circuit. The water supply circuit comprises a household inlet fitting 60, which is carried by the chassis 12, a conduit 62 that fluidly couples the inlet fitting 60 to the tub 18, and an actuatable valve 80. The actuatable valve 80 selectively controls the flow of liquid through the conduit 62, allowing the flow of liquid from the conduit 62 into the tub 18 when the actuatable valve 80 is in an opened position, and preventing the flow of liquid from the conduit 62 into the tub 18 when the actuatable valve 80 is in a closed position.

The drain pump 44 can draw liquid from the sump 38 and pump the liquid out of the dishwasher 10 to a household drain line 48. The recirculation pump 46 can draw liquid from the sump 38 and pump the liquid through the spray system 28 to supply liquid into the treating chamber 20 through a supply tube 50 to one or more of the sprayers 30, 32, 34, 36. In this manner, liquid can circulate from the sump 38 through the liquid recirculation system to the spray system 28 and back to the sump 38 to define a liquid recirculation circuit or flow path.

While the pump assembly 40 is illustrated as having separate drain and recirculation pumps 44, 46 in an alternative embodiment, the pump assembly 40 can include a single pump configured to selectively supply wash liquid to either the spraying system 28 or the drain line 48, such as by configuring the pump to rotate in opposite directions, or by providing a suitable valve system.

A heating system having a heater 52 can be located within or near the sump 38 for heating liquid contained in the sump 38. The heater 52 can also heat air contained in the treating chamber 20. Alternatively, a separate heating element (not shown) can be provided for heating the air circulated through the treating chamber 20. A filtering system (not shown) can be fluidly coupled with the recirculation flow path for filtering the recirculated liquid.

A user-accessible dispensing system can be provided for storing and dispensing one or more treating chemistries to the treating chamber 20. As shown herein, the user-accessible dispensing system can include a dispenser 54 mounted on an inside surface 88 of the door 22 such that the dispenser 54 is disposed in the treating chamber 20 when the door 22 is in the closed position. The dispenser 54 is configured to dispense treating chemistry to the dishes within the treating chamber 20. The dispenser 54 can have one or more compartments 56 closed by a door 58 on the inner surface 88 of the door 22. The dispenser 54 can be a single use dispenser which holds a single dose of treating chemistry, a bulk dispenser which holds a bulk supply of treating chemistry and which is adapted to dispense a dose of treating chemistry from the bulk supply during a cycle of operation, or a combination of both a single use and bulk dispenser.

The dispenser 54 can further be configured to hold multiple different treating chemistries. For example, the dispenser 54 can have multiple compartments defining different chambers in which treating chemistries can be held. While shown as being disposed on the door 22, other locations of the dispenser 54 are possible. However, the dispenser 54 is positioned to be accessed by the user for refilling of the dispenser 54, whether it is necessary to refill the dispenser 54 before each cycle (i.e. for a single user dispenser) or only periodically (i.e. for a bulk dispenser).

Figure 2:
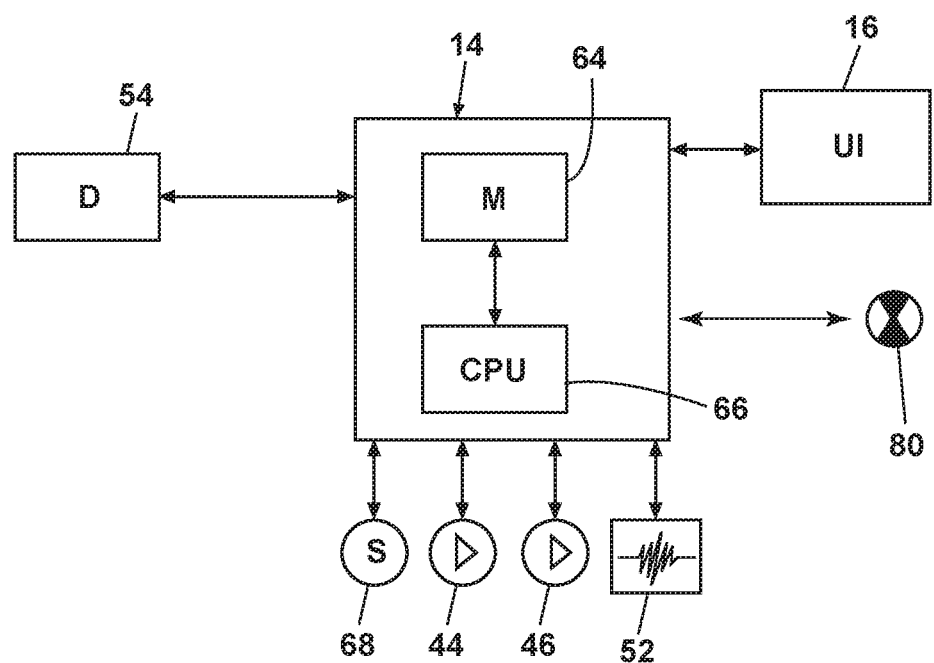
FIG. 2 illustrates a schematic view of a controller for use with the dishwasher of FIG. 1.

FIG. 2 is a schematic view of the controller 14 of the dishwasher 10 of FIG. 1. As illustrated schematically in FIG. 2, the controller 14 can be coupled with the heater 52 for heating the wash liquid during a cycle of operation, the drain pump 44 for draining liquid from the treating chamber 20, the recirculation pump 46 for recirculating the wash liquid during the cycle of operation, the user-accessible dispenser 54 for selectively dispensing treating chemistry to the treating chamber 20, and the actuatable valve 80 to selectively control the flow of liquid through the conduit 62 into the tub 18.

The controller 14 can be provided with a memory 64 and a central processing unit (CPU) 66. The memory 64 can be used for storing control software that can be executed by the CPU 66 in completing a cycle of operation using the dishwasher 10 and any additional software. For example, the memory 64 can store one or more pre-programmed cycles of operation that can be selected by a user and completed by the dishwasher 10. A cycle of operation for the dishwasher 10 can include one or more of the following steps: a wash step, a rinse step, and a drying step. The wash step can further include a pre-wash step and a main wash step. The rinse step can also include multiple steps such as one or more additional rinsing steps performed in addition to a first rinsing. The amounts of water and/or rinse aid used during each of the multiple rinse steps can be varied. The drying step can have a non-heated drying step (so called "air only"), a heated drying step or a combination thereof. These multiple steps can also be performed by the dishwasher 10 in any desired combination.

The controller 14 can also receive input from one or more sensors 68. Non-limiting examples of sensors 68 that can be communicably coupled with the controller 14 include a temperature sensor and turbidity sensor to determine the soil load associated with a selected grouping of dishes, such as the dishes associated with a particular area of the treating chamber 20.

Turning now to FIG. 3, there is illustrated a perspective view of the dishwasher 10 with the chassis 12 removed for ease of viewing the tub 18, which, by way of non-limiting example, can be injection molded of plastic, can include a bottom wall 70, side walls 72, 74, rear wall 76, and a top wall 78. The upper rack 24 and lower rack 26 can be coupled to the side walls 72, 74 for slidable movement relative thereto. A utensil basket 84, which contains a utensil 86, can be positioned within the lower rack 26, or at any other suitable location within the dishwasher 10.

Further, the dishwasher 10 can include a door latch assembly 100 comprising a door latch 102 provided on the inner surface 88 of the door 22 and a strike plate 110. While the door latch 102 is illustrated herein as being provided on the door 22 and the strike plate 110 is illustrated herein as being coupled with the tub 18, it will be understood that the door latch 102 could instead be coupled with the tub 18 while the strike plate 110 is coupled with the door 22, such that the door latch 102 and the strike plate 110 can be provided on either the door 22 or the tub 18. A receiving collar 130 can be attached to the top wall 78 of the tub 18, at a portion of the top wall 78 that is adjacent the door 22 when the door 22 is in the closed condition. In the case that the strike plate 110 is coupled with the door 22, the receiving collar 130 can also be coupled to the door 22, rather than the tub 18. The receiving collar 130 can define a rear surface 132, a front surface 134, and a bottom surface 136. The strike plate 110 can be received by the receiving collar 130 such that the strike plate 110 protrudes towards the door 22 from the front surface 134 of the receiving collar 130. The door latch 102 can be any time of latch mechanism or assembly such that it can selectively, mechanically couple with the strike plate 110 to hold the door 22 in the closed condition, non-limiting examples of which include a cam-actuated latch, a lever-type latch, or a hook latch. The door latch 102 can be positioned on the inner surface 88 such that it aligns with the strike plate 110 when the door 22 approaches the closed condition.

Figure 4:
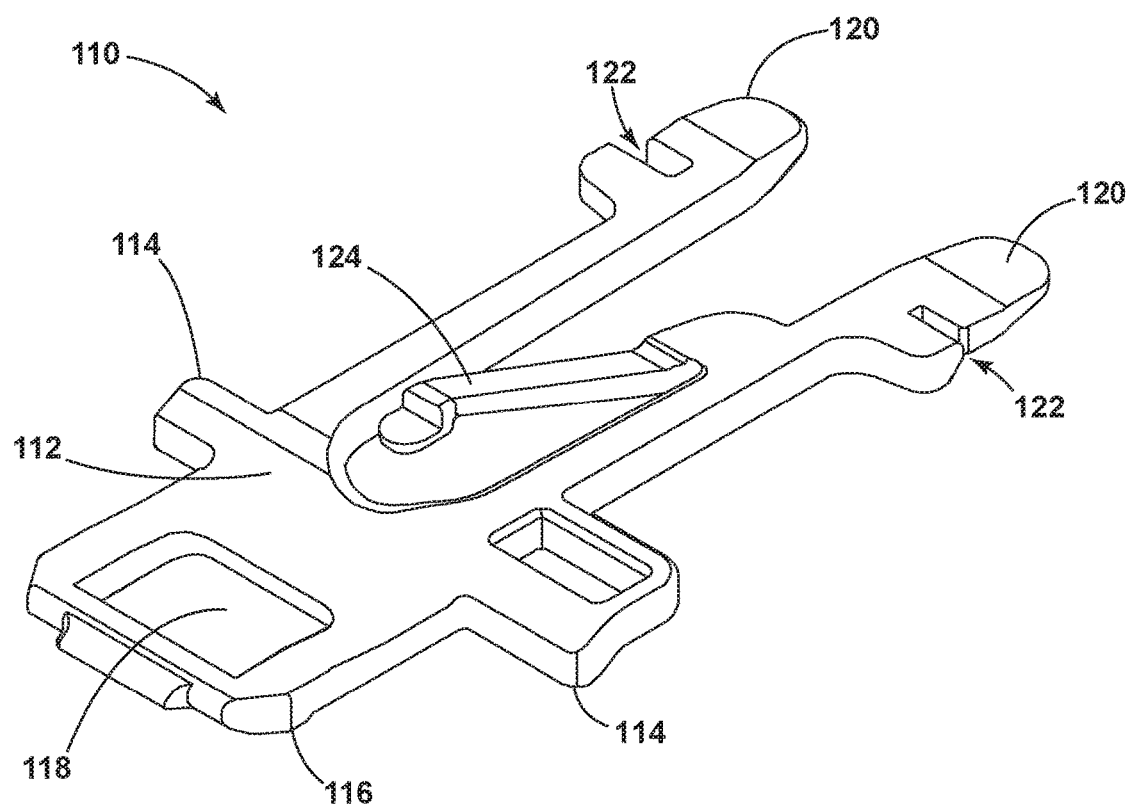
FIG. 4 illustrates a perspective view of a strike plate for use with the door latch assembly of FIG. 3 according to an embodiment of the present disclosure.
Figure 14:
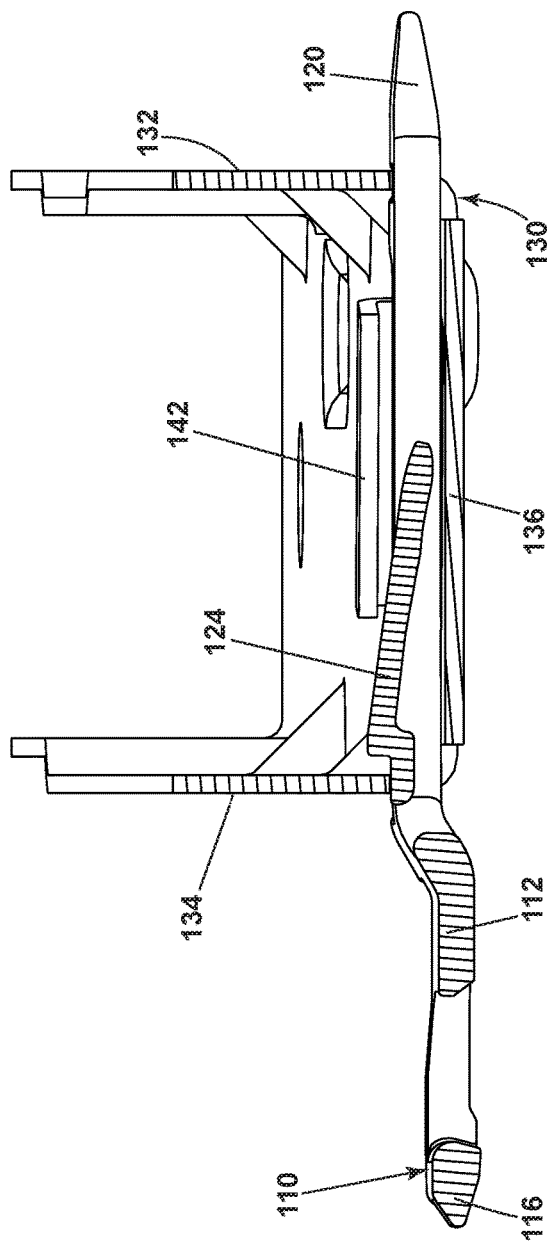
FIG. 14 illustrates a cross-sectional side view of the fully inserted position of FIG. 13.

In FIG. 4, a perspective view of the strike plate 110 can be seen. The strike plate 110 can define a strike plate body 112 that can be provided with at least one protruding rib 114 extending outwardly from at least one side of the strike plate body 112. The at least one protruding rib 114 protrudes substantially horizontally from the strike plate body 112 when the strike plate 110 is in a fully inserted position (FIG. 14) relative to the receiving collar 130. In the case that more than one protruding rib 114 is included, it will be understood that the protruding ribs 114 can have differing heights and widths from one another. A latch coupling portion 116 can extend forwardly from the strike plate body 112. The latch coupling portion 116 can define a latch opening 118 adapted to receive the door latch 102 when the door 22 is in the closed condition.

The strike plate 110 can further have at least one horizontal biasing element 120, biased in a first plane, which can extend from the strike plate body 112 in a direction opposite of the latch coupling portion 116 and serve as laterally spaced horizontal biasing elements 120. Each of the at least one horizontal biasing elements 120 can define a receiving channel 122, although it will be understood that it is also contemplated that more than one horizontal biasing element 120 can be included, with only one of the horizontal biasing elements 120 defining a receiving channel 122. The horizontal biasing elements 120 can have a component in a lateral direction that is perpendicular to an insertion direction of the strike plate 110 into the receiving collar 130. The strike plate 110 can further include at least one vertical biasing element 124. The vertical biasing element 124 can be thought of as a spring finger or spring arm extending upwardly from the plane defined by the strike plate 110. The vertical biasing element 124 can protrude either upwardly or downwardly from the strike plate 110. In an exemplary embodiment, the vertical biasing element 124 and the horizontal biasing elements 120 provide bias in directions generally perpendicular to one another. Further, both the first plane of the horizontal biasing elements 120 and the second plane of the vertical biasing element 124 can be perpendicular to the insertion direction.

Figure 5:
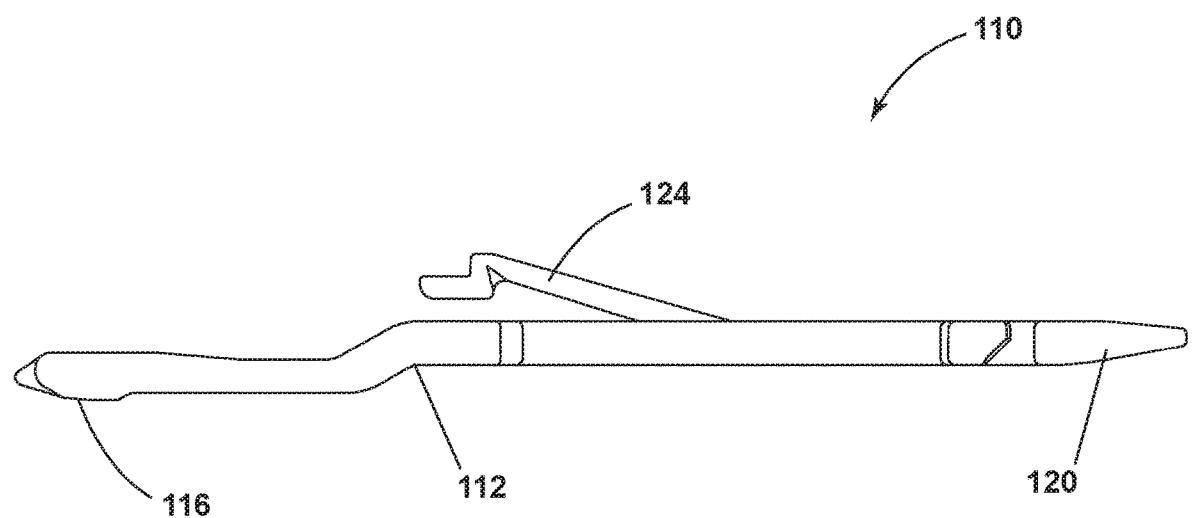
FIG. 5 illustrates a side view of the strike plate of FIG. 4.

FIG. 5 illustrates a side view of the strike plate 110 in which the protrusion of the vertical biasing element 124 in a vertical direction from the strike plate body 112 can be seen. While the vertical biasing element 124 is illustrated herein as protruding vertically upward from the strike plate 110, it will be understood that the vertical biasing element 124 can also protrude vertically downward from the strike plate 110.

The strike plate 110 can be formed from a plastic material, which can be any type of plastic material such that the strike plate 110 can exhibit desired wear characteristics. In an exemplary embodiment, the strike plate 110 can be formed from a glass-filled nylon. It will be understood that other materials are contemplated for the strike plate 110, non-limiting examples of which include non-glass-filled nylon and polyoxymethylene (POM).

Figure 6:
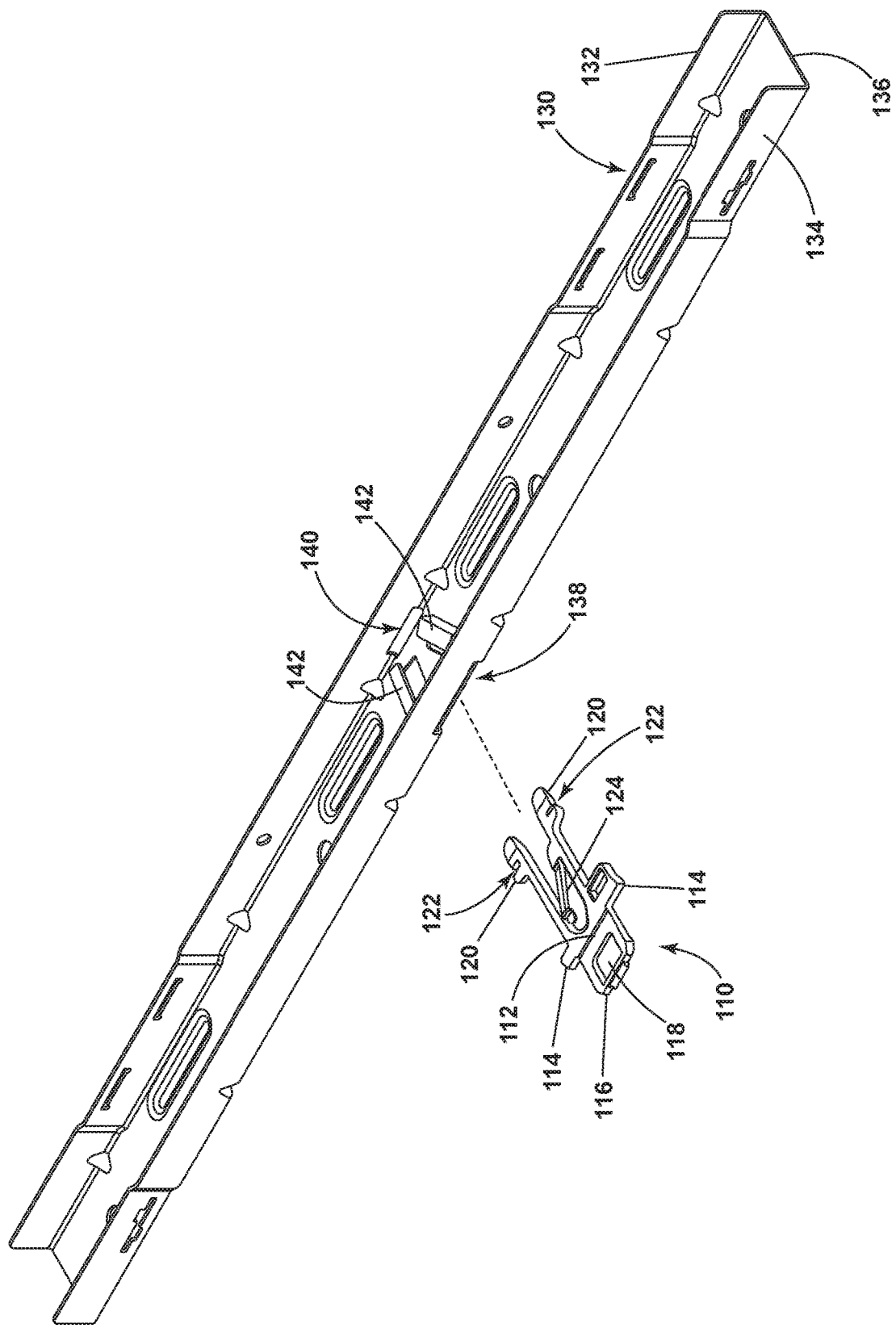
FIG. 6 illustrates a perspective view of the strike plate of FIG. 4 in an uninserted position with respect to a receiving collar for use with the door latch assembly of FIG. 3.

FIG. 6 illustrates the strike plate 110 in an uninserted position with respect to the receiving collar 130 such that the structure of the receiving collar 130 can be better seen. The front surface 134 of the receiving collar 130 can define a front opening 138 adapted to receive the strike plate 110 in an insertion direction. The rear surface 132 of the receiving collar 130 can define a rear opening 140 adapted for attachment with the strike plate 110. The bottom surface 136 of the receiving collar 130 can define at least one deflecting surface, illustrated herein as an angled surface 142. The angled surface 142 can be accessible through the front opening 138. In an exemplary embodiment, two angled surfaces 142 are provided opposing one another, physically separate and laterally spaced from each other, with one of the angled surfaces 142 biasing the first horizontal biasing element 120, and the other of the angled surfaces 142 biasing the other of the horizontal biasing elements 120 when the horizontal biasing elements 120 are received between the angled surfaces 142. The angled surfaces 142 can be positioned such that the distance between the angled surfaces 142 decreases from the front surface 134 to the rear surface 132. In an exemplary embodiment, the front opening 138 is wider than the rear opening 140, and the rear opening 140 is generally centered between the angled surfaces 142.

The receiving collar 130 can be formed from a rigid material, non-limiting examples of which include metal or a rigid plastic. In an exemplary embodiment, the receiving collar 130 can be a single stamped piece that extends along the top wall 78 of the tub 18. The receiving collar 130 can be fastened to the tub 18, as shown in FIG. 3, by any suitable fastening means, such as screws, heat staking, weld joints, or other fasteners. In addition, it will be understood that while the receiving collar 130 is illustrated herein as a separate piece that can be attached or fastened to the tub 18, it is also contemplated that the receiving collar 130 can be formed as a single monolithic piece with the tub 18.

Figure 7:
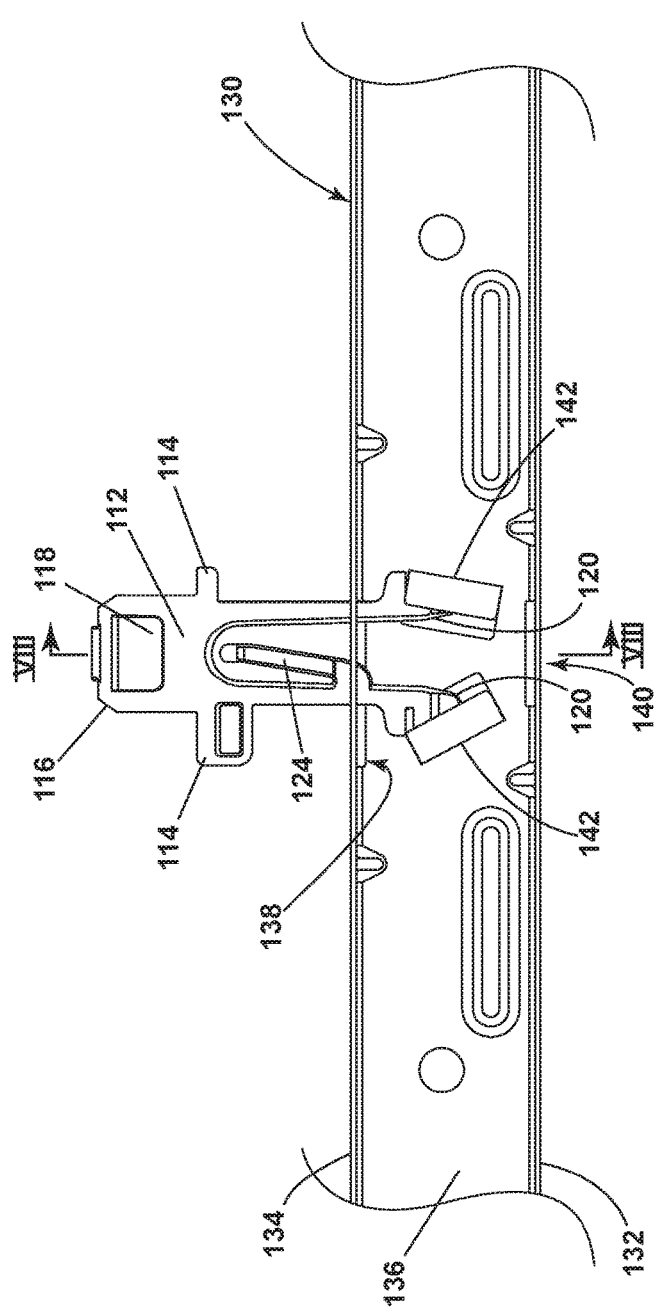
FIG. 7 illustrates a top view of the strike plate of FIG. 6 in a first installation position with respect to the receiving collar.

In FIG. 7, the strike plate 110 is shown in a first installation position, which would be occupied during manufacturing of the dishwasher 10, with respect to the receiving collar 130. In the first installation position, the strike plate 110 is partially received within the receiving collar 130. The horizontal biasing elements 120 have been inserted through the front opening 138 and are positioned between the angled surfaces 142 but are not yet inwardly deflected by the angled surfaces 142. In this view, it can be seen that the front opening 138 and the rear opening 140 can be laterally offset from one another. The lateral offset of the front opening 138 and the rear opening 140 improve the ease of aligning the strike plate 110 within the receiving collar 130 and ensure proper insertion, as well as reducing unwanted movement of the strike plate 110 within the receiving collar 130 and rattling or looseness that could result.

Figure 8:
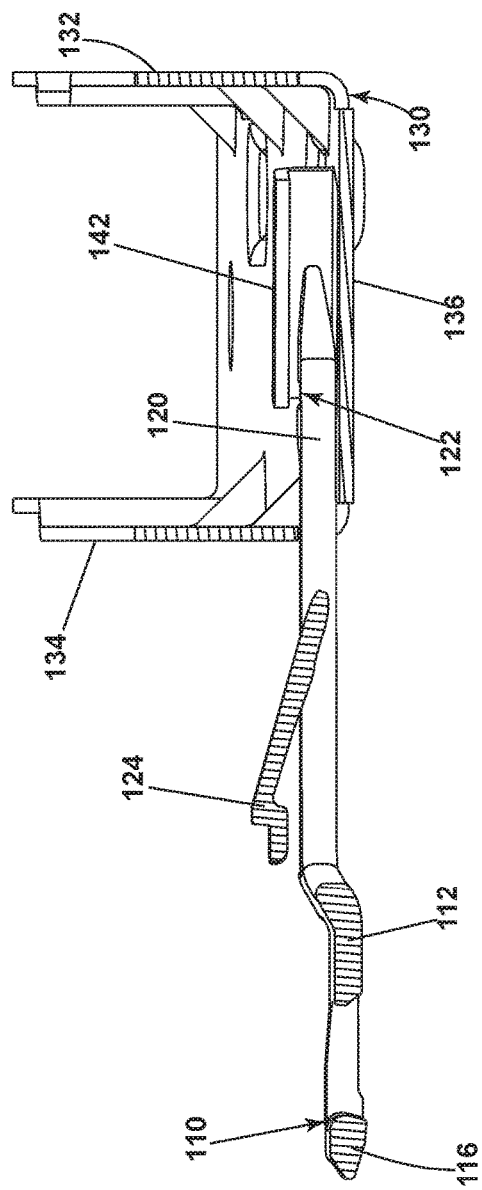
FIG. 8 illustrates a cross-sectional side view of the first installation position of FIG. 7.

FIG. 8 illustrates a cross-sectional side view of the first installation position of FIG. 7, showing that the vertical biasing element 124 is not being deflected by the receiving collar 130 in the first installation position.

Figure 9:
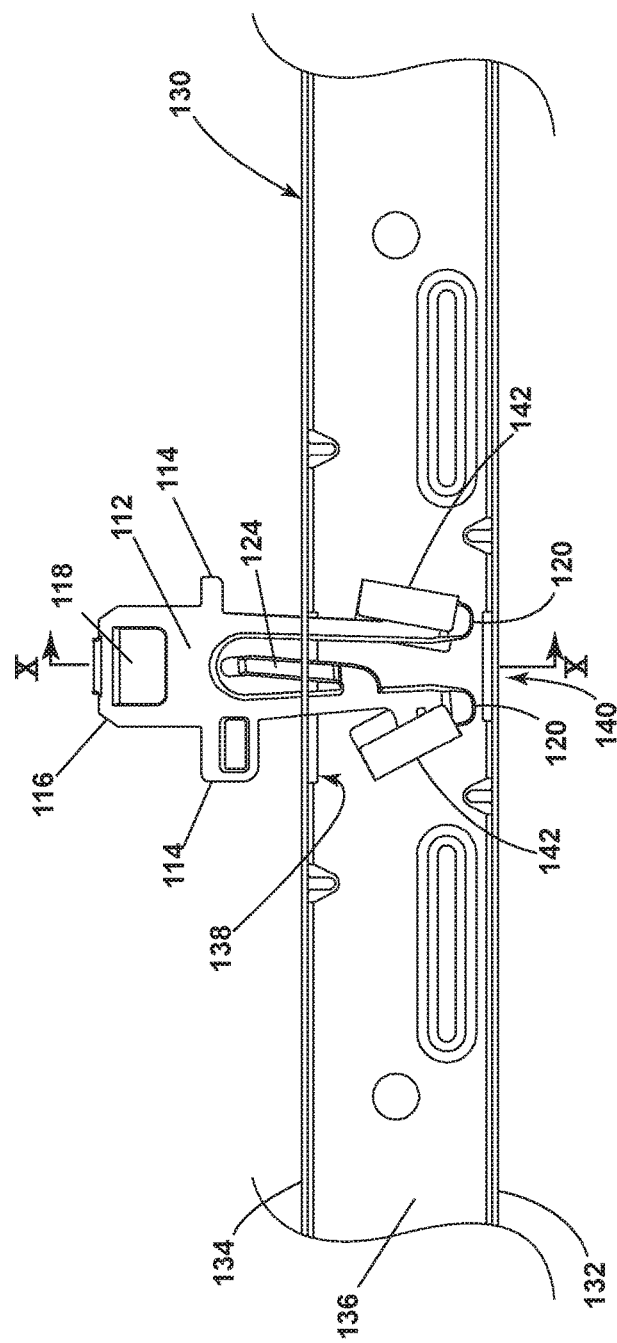
FIG. 9 illustrates a top view of the strike plate and receiving collar of FIG. 6 with the strike plate in a second installation position with respect to the receiving collar.
Figure 10:
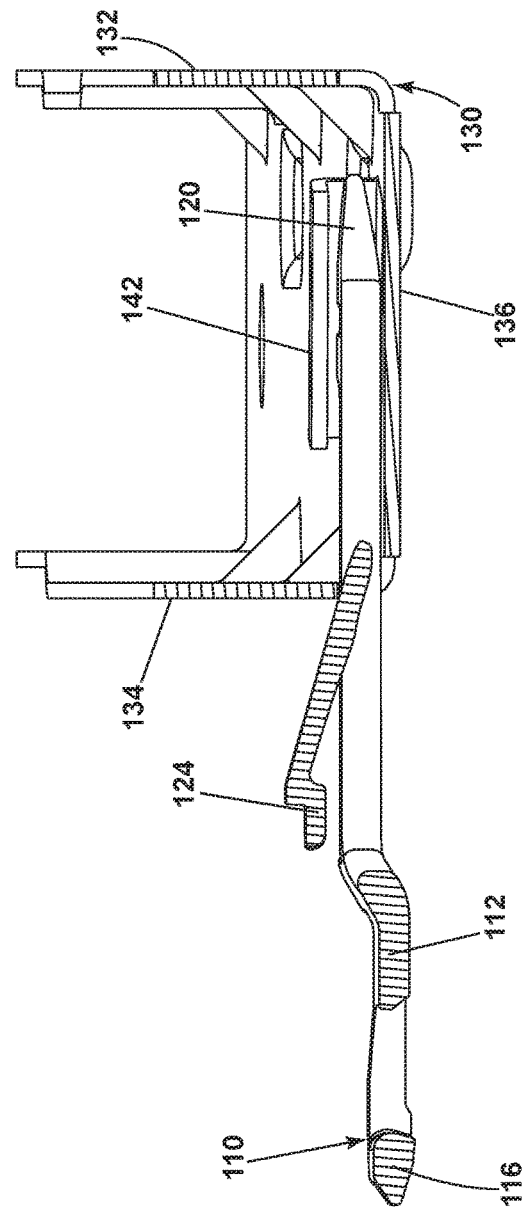
FIG. 10 illustrates a cross-sectional side view of the second installation position of FIG. 9.

In FIG. 9, the strike plate 110 is shown in a second installation position with respect to the receiving collar 130. In the second installation position, the strike plate 110 is received further in the receiving collar 130 than in the first installation position. The horizontal biasing elements 120 are now in contact with and can resiliently bear against the angled surfaces 142 such that the angled surfaces 142 inwardly deflect or bias the horizontal biasing elements 120 in the lateral direction toward one another, such that the horizontal biasing elements 120 are biased in opposite lateral directions due to their arrangement relative to the angled surfaces 142. The vertical biasing element 124 is slightly deflected downwardly by the front surface 134, and specifically by the vertical height of the front opening 138, which can be seen in the cross-sectional side view of the second installation position illustrated in FIG. 10. As can be seen here, and in an exemplary embodiment, the total width of the strike plate 110 at the position of the protruding ribs 114 can be wider than the front opening 138, defining an off-center or asymmetrical shape for the strike plate 110, which prevents the strike plate 110 from having the incorrect end inserted into the receiving collar 130 and permits only one insertion orientation of the strike plate 110 into the receiving collar 130. If the end having the latch coupling portion 116 were inserted into the front opening 138 first, insertion past the point of the protruding ribs 114 would be prevented.

Figure 11:
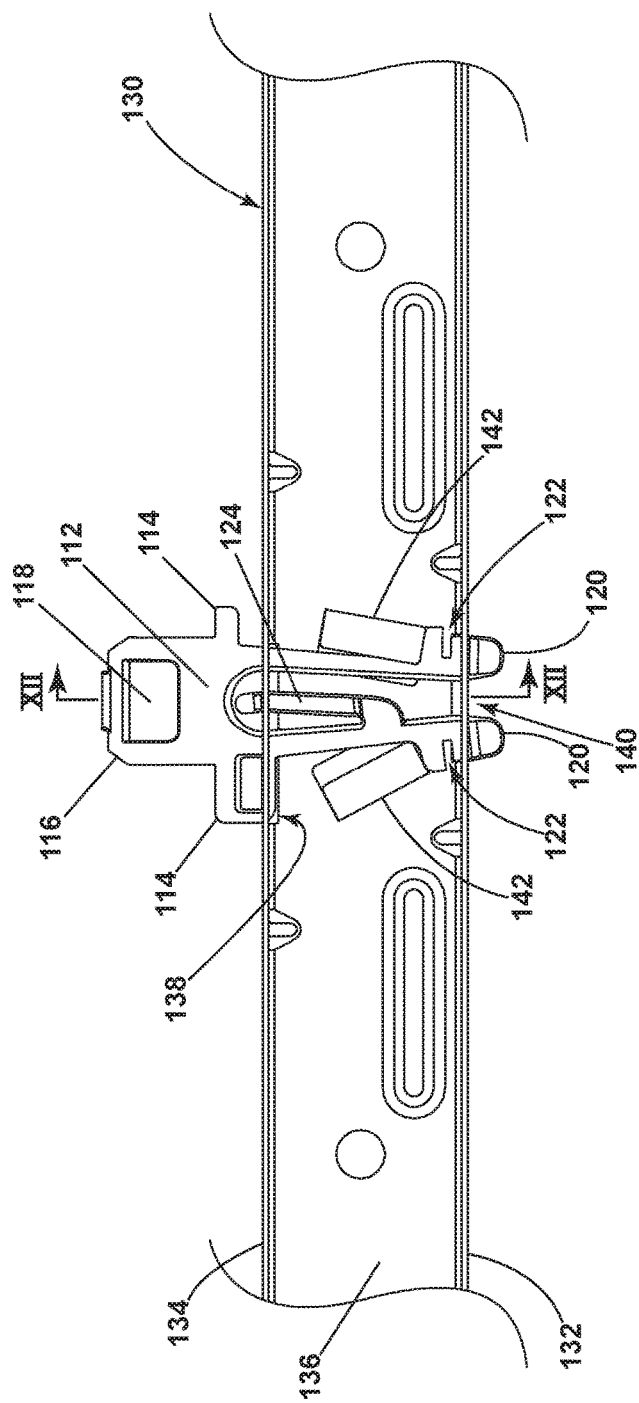
FIG. 11 illustrates a top view of the strike plate and receiving collar of FIG. 6 with the strike plate in a third installation position with respect to the receiving collar.
Figure 12:
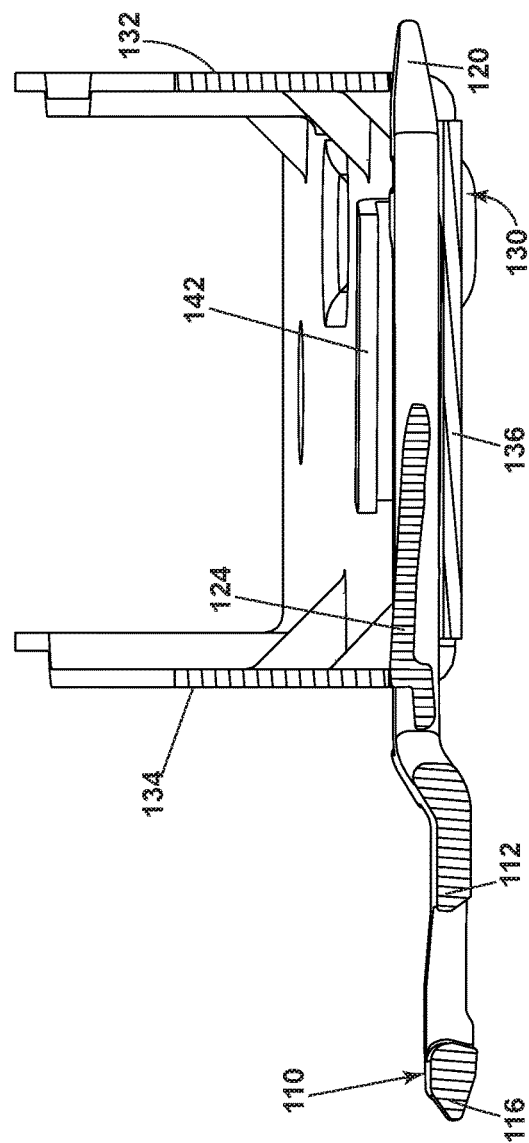
FIG. 12 illustrates a cross-sectional side view of the third installation position of FIG. 11.

In FIG. 11, the strike plate 110 is shown in a third installation position with respect to the receiving collar 130. In the third installation position, the strike plate 110 is received further in the receiving collar 130 than in the second installation position. The horizontal biasing elements 120 are inserted past the angled surfaces 142 and begin to protrude through the rear opening 140. The rear opening 140 can have a narrower width than the width of the horizontal biasing elements 120, such that the rear opening 140 inwardly deflects the horizontal biasing elements 120 toward one another in the third installation position. The vertical biasing element 124 is deflected downwardly by the front opening 138, which can be seen in the cross-sectional side view of the third installation position illustrated in FIG. 12. In an exemplary embodiment, one of the protruding ribs 114 is receiving within the width of the front opening 138.

Figure 13:
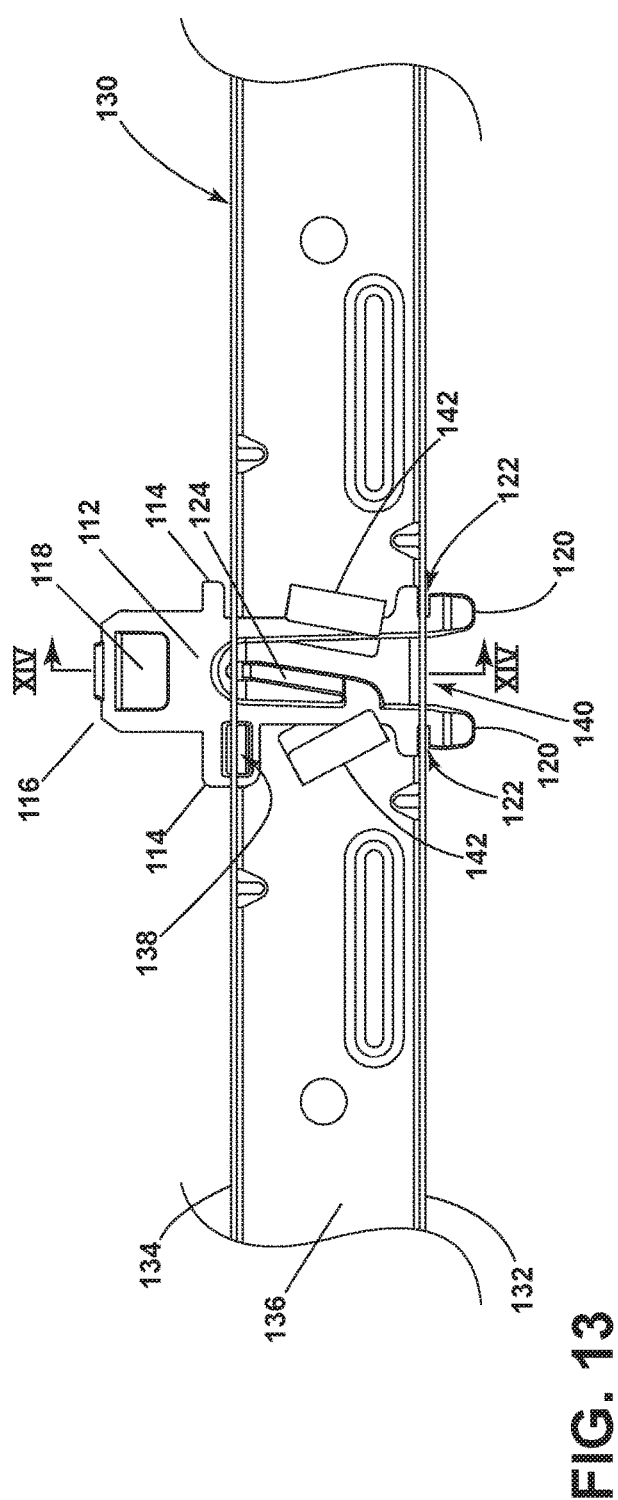
FIG. 13 illustrates a top view of the strike plate and receiving collar of FIG. 6 with the strike plate in a fully inserted position with respect to the receiving collar.

In FIG. 13, the strike plate 110 is shown in a fully inserted position with respect to the receiving collar 130. The horizontal biasing elements 120 are no longer deflected by the rear surface 132 or the rear opening 140. Rather, the rear surface 132 is received within the receiving channels 122, such that further front-to-back or back-to-front movement and side-to-side movement of the strike plate 110 with respect to the rear opening 140 is inhibited or prevented. In an exemplary embodiment, one of the receiving ribs 114 is received within the front opening 138 such that the width of the protruding rib 114 and the strike plate body 112 inhibit or prevent side-to-side movement of the strike plate 110 within the front opening 138, while the other of the protruding ribs 114 is prevented from entering the front opening 138 and instead bears against the front surface 134. The vertical biasing element 124 is received within the front opening 138 such that the front opening 138 and front surface 134 deflect the vertical biasing element 124 toward the strike plate body 112 and the vertical biasing element 124 resiliently bears against the front opening 138 and the front surface 134, which can be seen in the cross-sectional side view of the fully inserted position illustrated in FIG. 14. Further, the vertical biasing element 124 can be shaped such that, when the strike plate 110 is in the fully inserted position, the shape of the vertical biasing element 124 engages the front surface 134 to prevent removal of the strike plate 110 from the receiving collar 130. The bearing of the vertical biasing element 124 against the front opening 138 prevents movement of the strike plate 110 and associated rattling noises that could otherwise occur.

Turning now to the operation of the installation of the strike plate 110 into the receiving collar 130, as the strike plate 110 is inserted into the receiving collar 130 through the installation positions, the horizontal biasing elements 120 are deflected inwardly by the angled surfaces 142 as the strike plate 110 is inserted further. Once the horizontal biasing elements 120 have been inserted past the angled surfaces 142, they are biased back outward to a non-deflected position, which prevents the strike plate 110 from being pulled back through the angled surfaces 142. The horizontal biasing elements 120 then come to bear against the rear opening 140, until the receiving channels 122 align with the rear surface 132. When the receiving channels 122 align with the rear surface 132, the horizontal biasing elements 120 are no longer deflected by the rear opening 140 and can be again biased outward to the non-deflected position, preventing further insertion or withdrawal of the strike plate 110 from the receiving collar 130.

Additionally, as the strike plate 110 approaches the fully inserted position, the vertical biasing element 124 is deflected further towards the strike plate body 112 by the front opening 138, resulting in steadily increasing vertical pressure by the vertical biasing element 124 against the front opening 138. The biasing of the vertical biasing element 124 against the front opening 138 dampens upward and downward movement of the strike plate 110 relative to the receiving collar 130, reducing rattling noises associated with the opening and closing of the door 22.

The embodiments described herein provide a strike plate for a dishwasher door latch assembly that can be easily installed and with features that prevent or discourage incorrect installation. The width of the protruding ribs relative to the front opening prevent the strike plate from being installed in the wrong direction. The strike plate can be easily installed, even installed with a single hand due to the structural features that ensure proper alignment of the strike plate with the receiving collar with reduced installation force as compared to conventional strike plates. The inclusion of the angled surfaces that act as a deflecting surface reduce the installation force needed to insert the strike plate by allowing for gradual deflection of the horizontal biasing elements. The multiple features that lock the strike plate in place relative to the receiving collar allow for a tighter tolerance on the manufacturing of the door and the door latch assembly because unwanted movement of the strike plate within the receiving collar in the fully inserted position is prevented. By forming the strike plate of a plastic, rather than metal, cost savings can be realized. Rattling noises that are unpleasant to a user are also reduced by the embodiments of the present disclosure.

It will also be understood that various changes and/or modifications can be made without departing from the spirit of the present disclosure. To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A dishwasher comprising:
a tub at least partially defining a treating chamber with an access opening and having a top wall;
a door movable between opened and closed positions to selectively close the access opening;
a receiving collar coupled to one of the tub or the door and having an opening and a deflecting surface accessible through the opening; and
a strike plate coupled to the one of the tub or the door and received within the opening in the receiving collar in an insertion direction, the strike plate having at least one biasing element biased in a first plane, the biasing element having a component in a lateral direction perpendicular to the insertion direction such that inserting the biasing element into the opening in the insertion direction results in the biasing element being biased in the lateral inward direction by the deflecting surface.

2. The dishwasher of claim 1 wherein the at least one lateral biasing element comprises first and second, laterally spaced, biasing elements.

3. The dishwasher of claim 2 wherein the first and second biasing elements are arranged relative to the deflecting surface such that the first and second biasing elements are biased in opposite lateral directions.

4. The dishwasher of claim 3 wherein the deflecting surface comprises first and second angled surfaces, which are laterally spaced from each other, with the first angled surface biasing the first biasing element and the second angled surface biasing the second biasing element.

5. The dishwasher of claim 4 wherein the first and second biasing elements are received between the first and second angled surfaces.

6. The dishwasher of claim 5 wherein the first and second angled surfaces are physically separate.

7. The dishwasher of claim 1 wherein the strike plate has a shape permitting only one insertion orientation.

8. The dishwasher of claim 7 wherein the strike plate has an asymmetrical shape to permit the only one insertion orientation.

9. The dishwasher of claim 2 further comprising a third biasing element, which is biased in a second plane that is perpendicular to the first plane.

10. The dishwasher of claim 9 wherein the second plane is further perpendicular to the insertion direction.

11. A dishwasher comprising:
a tub at least partially defining a treating chamber with an access opening and having a top wall;
a door movable between opened and closed positions to selectively close the access opening;
a receiving collar coupled to one of the tub or the door and having an opening and a deflecting surface accessible through the opening; and
a strike plate coupled to the one of the tub or the door and received within the opening in the receiving collar in an insertion direction, the strike plate having at least two biasing elements biased in directions perpendicular to one another such that inserting the biasing elements into the opening in the insertion direction results in at least one of the biasing elements being biased in the lateral inward direction by the deflecting surface.

12. The dishwasher of claim 11 wherein both of the at least two biasing elements are biased in a direction perpendicular to the insertion direction.

13. The dishwasher of claim 11 wherein one of the biasing elements comprises at least one lateral biasing element.

14. The dishwasher of claim 13 wherein the at least one lateral biasing element comprises first and second, laterally spaced, biasing elements.

15. The dishwasher of claim 14 wherein the first and second biasing elements are arranged relative to the deflecting surface such that the first and second biasing elements are biased in opposite lateral directions.

16. The dishwasher of claim 15 wherein the deflecting surface comprises first and second angled surfaces, which are laterally spaced from each other, with the first angled surface biasing the first biasing element and the second angled surface biasing the second biasing element.

17. The dishwasher of claim 16 wherein the first and second biasing elements are received between the first and second angled surfaces.

18. The dishwasher of claim 17 wherein the first and second angled surfaces are physically separate.

19. The dishwasher of claim 11 wherein the strike plate has a shape permitting only one insertion orientation.

20. The dishwasher of claim 19 wherein the strike plate has an asymmetrical shape to permit the only one insertion orientation.

\* \* \* \* \*